(12) United States Patent
Gopu

(10) Patent No.: US 10,616,225 B2
(45) Date of Patent: Apr. 7, 2020

(54) CONTROLLING ACCESS RIGHTS OF A DOCUMENT USING ENTERPRISE DIGITAL RIGHTS MANAGEMENT

(71) Applicant: TATA CONSULTANCY SERVICES LIMITED, Mumbai (IN)

(72) Inventor: Srinivas Reddy Gopu, Hyderabad (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 880 days.

(21) Appl. No.: 14/288,336

(22) Filed: May 27, 2014

(65) Prior Publication Data

US 2014/0351952 A1 Nov. 27, 2014

(30) Foreign Application Priority Data

May 27, 2013 (IN) .......................... 1874/MUM/2013

(51) Int. Cl.
*G06F 21/10* (2013.01)
*H04L 29/06* (2006.01)

(52) U.S. Cl.
CPC .............. *H04L 63/10* (2013.01); *G06F 21/10* (2013.01); *G06F 21/105* (2013.01)

(58) Field of Classification Search
CPC ...... G06Q 10/103; G06Q 50/18; G06F 21/10; G06F 21/86
See application file for complete search history.

(56) References Cited

U.S. PATENT DOCUMENTS

| 7,992,188 B2* | 8/2011 | Ohta ................... G06F 21/6209 705/67 |
| 8,458,802 B2* | 6/2013 | Baca ....................... G06F 21/10 713/189 |
| 2009/0100060 A1 | 4/2009 | Livnat et al. |
| 2011/0162076 A1* | 6/2011 | Song ..................... G06F 21/554 726/26 |
| 2012/0304306 A1 | 11/2012 | Chamarty et al. |

(Continued)

FOREIGN PATENT DOCUMENTS

| IN | 1162/MUM/2011 | 11/2012 |
| IN | 2192/MUM/2011 | 2/2013 |

(Continued)

OTHER PUBLICATIONS

Hampel, Access Rights—The Keys to Cooperative Work/Learning. U. Kock Wiil (Ed.): MIS 2004, LNCS 3511, pp. 14-31, 2004.*

(Continued)

*Primary Examiner* — Johann Y Choo
(74) *Attorney, Agent, or Firm* — Womble Bond Dickinson (US) LLP

(57) ABSTRACT

Systems and methods for controlling access rights of a document using enterprise digital rights managements are described. A document is encrypted for generating a protected document and access rights are assigned to a user upon receiving a request from an owner of the document. The access rights include offline access of the protected document by the user. Upon assigning the access rights, access information of the user is monitored. Based on the access information, the user is locked from accessing the protected document when the access information indicates misuse of the protected document by the user.

8 Claims, 3 Drawing Sheets

(56) References Cited

U.S. PATENT DOCUMENTS

| | | | |
|---|---|---|---|
| 2013/0086693 A1* | 4/2013 | Laverdiere-Papineau | G06F 21/6218 726/28 |
| 2014/0047556 A1* | 2/2014 | Davis | H04L 63/107 726/28 |
| 2014/0150080 A1* | 5/2014 | Miller | G06F 21/10 726/9 |
| 2014/0189483 A1* | 7/2014 | Awan | H04L 63/08 715/212 |
| 2014/0189818 A1* | 7/2014 | Meyer | G06F 21/62 726/4 |
| 2014/0245015 A1* | 8/2014 | Velamoor | H04L 63/061 713/171 |
| 2014/0351952 A1* | 11/2014 | Gopu | H04L 63/10 726/27 |
| 2015/0135300 A1* | 5/2015 | Ford | G06F 16/93 726/11 |

FOREIGN PATENT DOCUMENTS

| | | |
|---|---|---|
| IN | 2775/MUM/2011 | 4/2014 |
| IN | 2806/MUM/2011 | 5/2014 |

OTHER PUBLICATIONS

Bertino et al. An Extended Authorization Model for Relational Databases. IEEE Transactions on Knowledge and Data Engineering, vol. 9, No. 1, Jan.-Feb. 1997.*

Armjisoft, "PDF DRM, Security, Protection and Distribution Management Solution—PDF Security OwnerGuard (v12.6.0)", retrieved from: http://www.armjisoft.com/?page=pdfownerguard#PDF%20DRM%20Security, 9 pages, published online: Jun. 13, 2006.

Yang Yu, et al., "Enterprise Digital Rights Management: Solutions against Information Theft by Insiders", retrieved from: http://www.ecsl.cs.sunysb.edu/tr/TR169.pdf, 26 pages, published online: Feb. 8, 2006.

* cited by examiner

CONTROLLING ACCESS RIGHTS OF A DOCUMENT USING ENTERPRISE DIGITAL RIGHTS MANAGEMENT

TECHNICAL FIELD

The present subject matter relates, in general, to digital rights management, and particularly, but not exclusively, to controlling access rights of a document using enterprise digital rights management.

BACKGROUND

Typically, enterprises employ enterprise digital rights management (eDRM) technology to protect confidential documents, such as product overviews, marketing plans, customer lists, sales reports, lab reports, journals, and thesis papers, in a digital format. The eDRM technology facilitates the users within the enterprise to accessing, copying, printing, and sharing of the confidential documents. To this end, the eDRM technology facilitates the users to encrypt the confidential documents and assign one or more access rights, such as an open right, an edit right, a copy right, and a print right for other users. Further, the eDRM technology limits the sharing of the confidential documents by enforcing the access rights assigned to other users such that the encrypted documents are available in a readable format to only those users to whom access rights are assigned.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
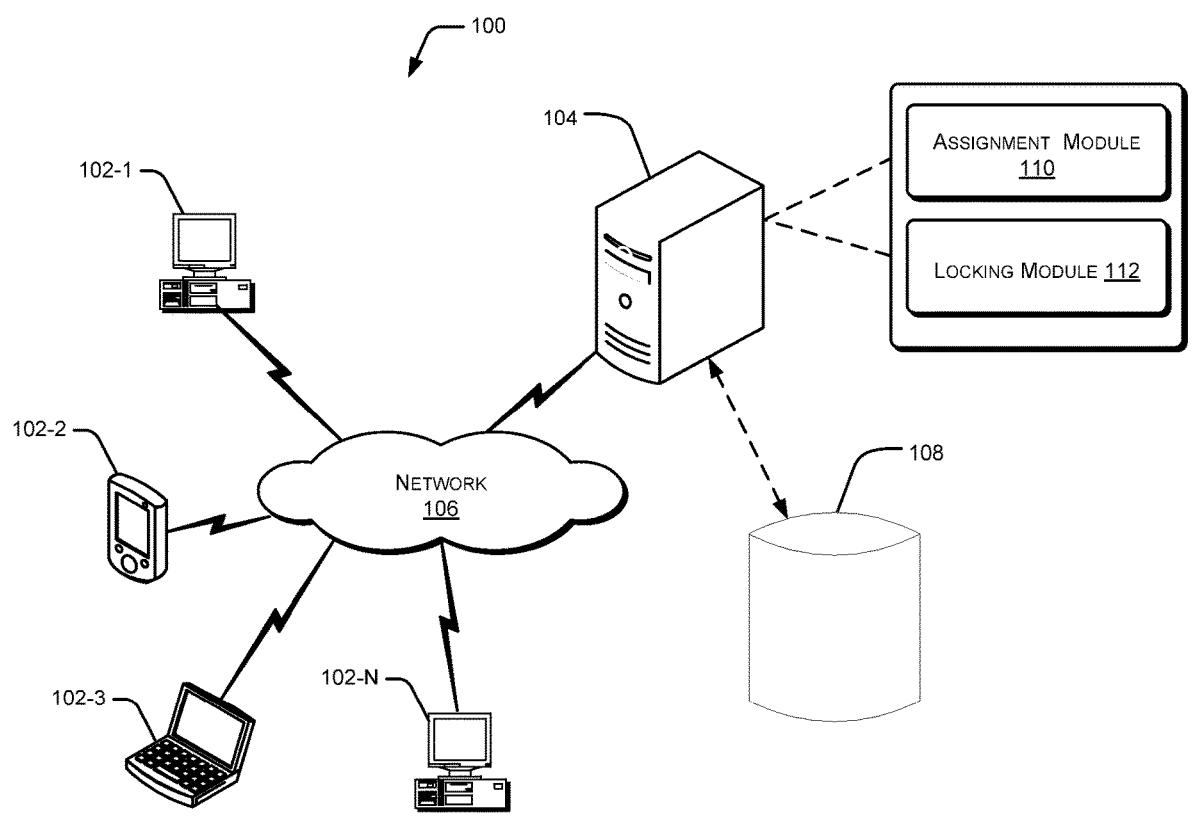
FIG. 1 illustrates a network environment implementing an enterprise digital rights management (eDRM) using an eDRM server, in accordance with an embodiment of the present subject matter.

Systems and methods for controlling access rights of a document using enterprise digital rights management (eDRM) are described herein. Generally, eDRM technology is used by enterprise users for protecting confidential documents and managing sharing of such protected confidential documents. Such eDRM technology provides various features, such as encryption of the confidential documents and assignment of various access rights to various other users in the enterprise for accessing the protected confidential documents. Further, such eDRM technology limits sharing of the protected confidential documents by enforcing the assigned access rights such that only authorized users are able to access and share the protected confidential documents. However, such eDRM technology typically requires installation of specific applications on a central server within the enterprise and on each client device communicating with the central server within the enterprise. Also, such eDRM technology allows access to the protected confidential documents only when a connection between the central server and the client devices is available. Further, such eDRM technology allows an owner of the confidential documents to lock specific confidential documents or users irrespective of whether access rights have been assigned or not based on certain criteria, such as sensitivity of the information in the confidential documents.

The present subject matter describes systems and methods for controlling access rights of a document using eDRM. An eDRM server described herein enables an enterprise user present in a network environment to protect the document and also control access rights to the document. The network environment may include a public environment, such as Internet, or a private network environment, such as an enterprise network environment. Further, the eDRM server is communicatively coupled with a client device over the network. After successful coupling of the eDRM server and positive authentication of user credentials, the enterprise user is allowed to access various functions of the eDRM server through the client device. The enterprise user may thus easily access the eDRM server without a need for installation of any specific application on the client device of the enterprise user.

According to an embodiment, the eDRM server may receive an encrypt request from an owner of the document for encrypting the document and generate a protected document based on the received request. In one implementation, the eDRM server may receive the encrypt request from the owner to simultaneously encrypt a plurality of documents. Based on the received encrypt request, the eDRM server may generate a plurality of protected documents simultaneously.

The eDRM server may further receive an assignment request from the owner to control access to the protected document by assignment of specific access rights to users. The access rights may be defined as rights indicative of any action which a user is allowed to take on the protected documents, such as open, edit, copy, print, and offline access. Based on the received assignment request, the eDRM server may assign specific access rights to the users. In one implementation, the eDRM server may receive the assignment request from the owner to assign access rights of plurality of protected documents to a plurality of users. Based on the received assignment request, the eDRM server may assign the access rights to the plurality of users simultaneously. In one another implementation, the eDRM server may receive the assignment request from the owner to simultaneously encrypt the documents and assign access rights to the user. Further, the eDRM server may assign a temporary ownership of all the protected documents to another user for a predetermined period of time upon receiving the assignment request from the owner of the protected documents.

In one implementation, upon assignment of the rights, the eDRM server may monitor access information of the user to ensure protection of the protected documents. The access information may include details of the actions taken by the user on the protected documents. In one example, the access information may be audit logs of the user saved in the eDRM server. Based on the access information, the eDRM server may lock the user from further accessing the protected document if the access information indicates a misuse of the protected documents. The misuse of the protected documents may be an action taken on the protected documents which is not allowed. For example, if a user A who is not assigned the access right to open a protected document received from a user B, tries to open the protected document then the eDRM server may lock the user A from using other access rights, such as accessing and editing the protected document also. In one implementation, the eDRM server may lock the user upon receiving a lock request from the owner of the protected document for locking the user based on the access information analyzed by the owner or an IT administrator.

Further, the eDRM server may also allow the users to access the protected documents when the connection between the client device and the eDRM server is not available. For the purpose, the eDRM server may assign offline access rights to the user and allow the user to access the protected documents offline upon receiving an offline access request from the user having the offline access rights. Upon receiving the offline access request, the eDRM server may provide an offline cache having access rights information of all the protected documents, for which the user has offline access right, on the client device when the connection is available between the client device and the eDRM server. In one implementation, the offline cache may be a local copy of access rights information about the protected documents from the eDRM database and may be downloaded as an encrypted file having access rights information of the protected documents on the client device. Upon receiving the offline cache on the client device, the user may access the protected documents for a predetermined time period based on the access rights information when the offline cache is available on the client device. Upon expiry of the predetermined time period, the user may again send the offline access request to the eDRM server for accessing the protected documents.

The present subject matter thus provides a method and a system for controlling access rights to a document using eDRM by monitoring action taken by a user on the document based on access rights assigned to the user and locking the user from accessing the document when the monitoring indicates a misuse of the document. Further, the eDRM server may be integrated with a client device without a need for installing a specific application on a client device. Further, the eDRM server may allow a user having offline access to document to download the document onto the client device when the connection is available between the client device and the eDRM server and to access the downloaded document for a predetermined time period when the connection is not available between the client device and the eDRM server. Thereby, allowing access to document by a user when the connection is not available between the client device and the eDRM server.

Figure 2:
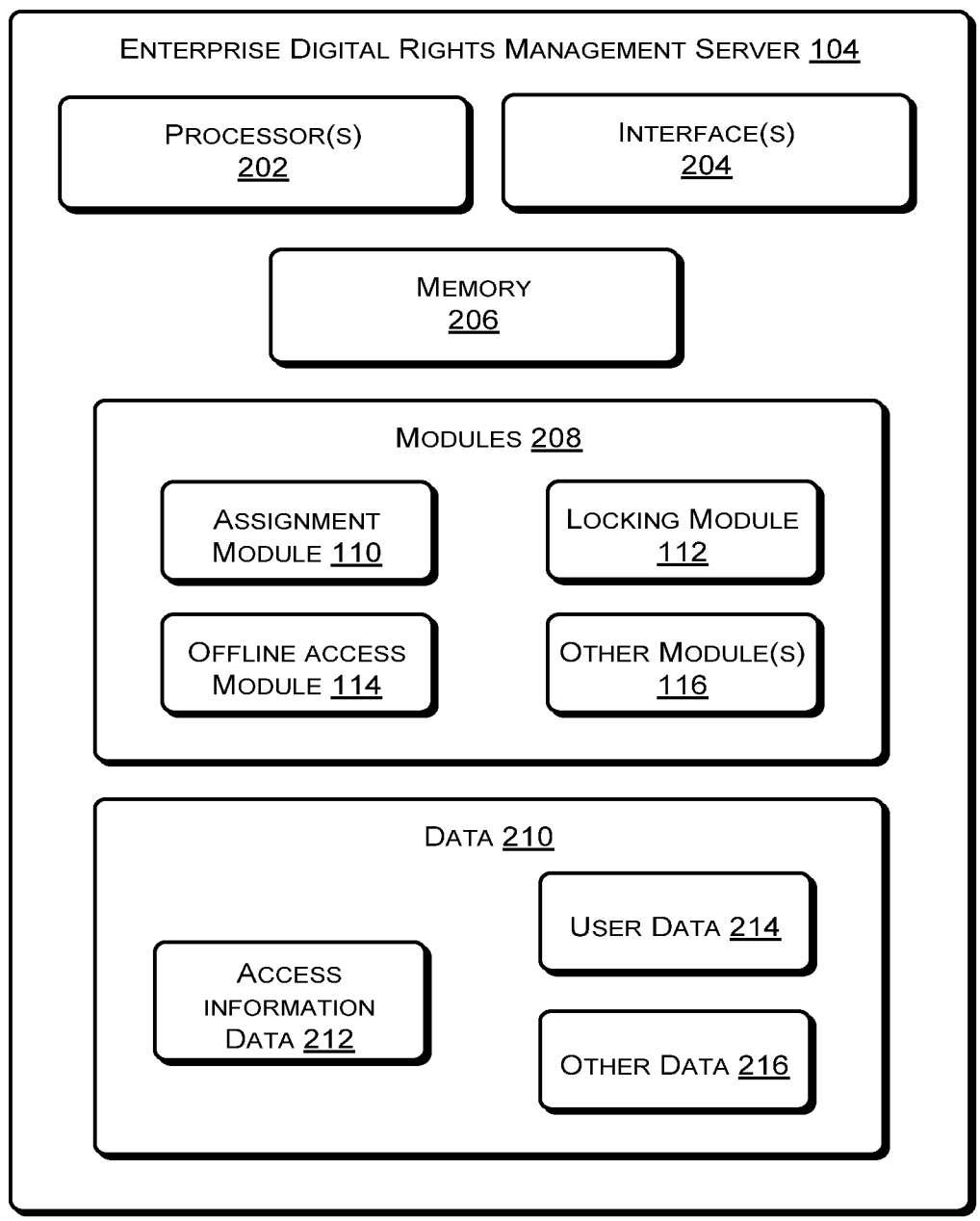
FIG. 2 illustrates the eDRM server, in accordance with an embodiment of the present subject matter.
Figure 3:
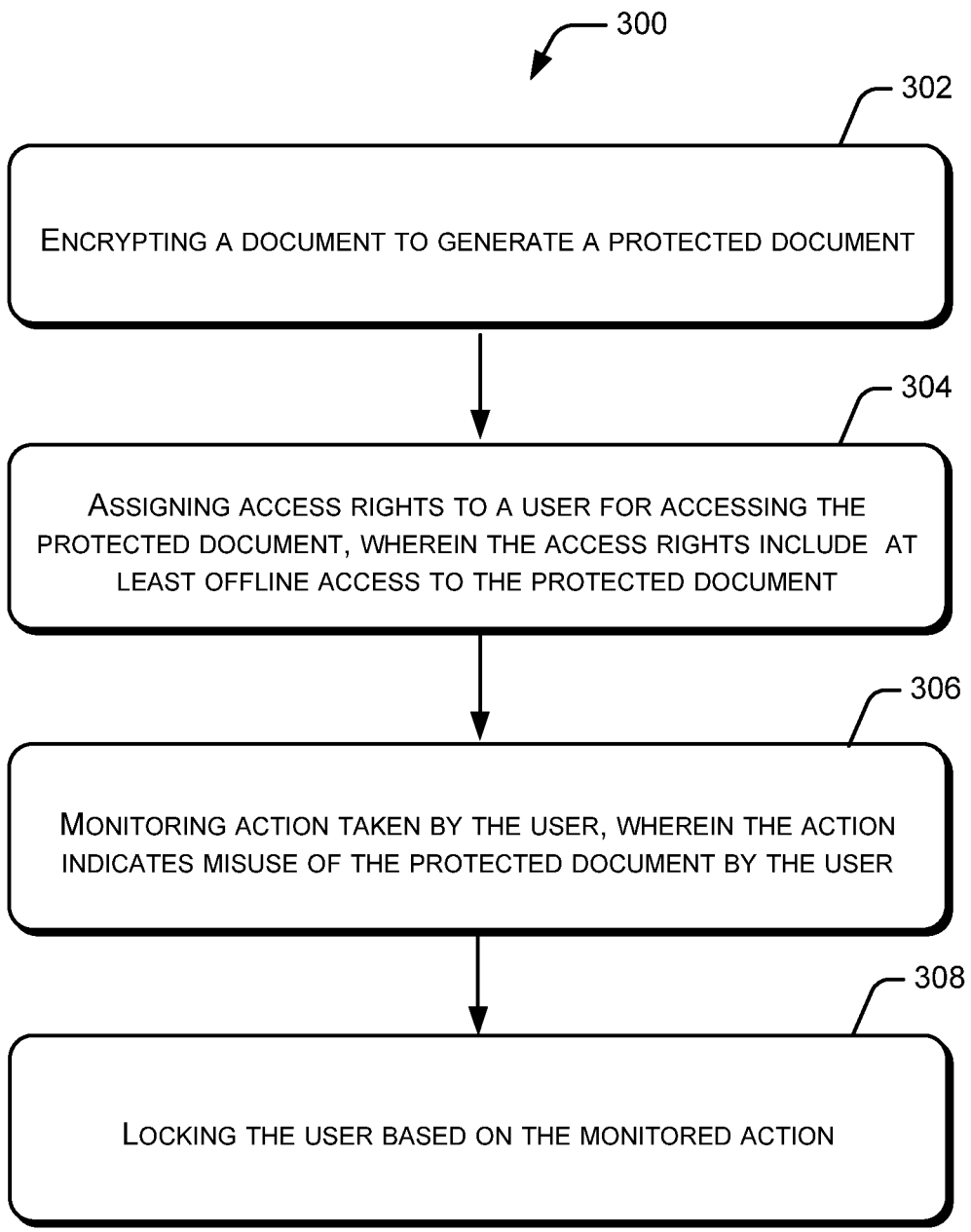
FIG. 3 illustrates a method for controlling access rights of a document using enterprise digital rights management, in accordance with an embodiment of the present subject matter.

The manner in which the systems and methods for controlling access rights of a document using enterprise digital rights management are implemented is explained in detail with respect to FIGS. 1, 2, and 3. While aspects of described systems and methods for controlling access rights may be implemented in any number of different computing systems, environments, and/or configurations, the embodiments are described in the context of the following system(s).

FIG. 1 illustrates a network environment 100 implementing an enterprise digital rights management (eDRM) technology for controlling access rights of a document using the eDRM technology, in accordance with an embodiment of the present subject matter. The network environment 100 comprises of client devices 102-1, 102-2, 102-3, . . . , 102-N connected to an eDRM server 104, through a network 106. For the sake of clarity, the client devices 102-1, 102-2, 102-3, . . . , 102-N are collectively referred to as client devices 102 and individually referred to as client device 102.

Examples of the client devices 102 include, but are not restricted to, desktop computers, laptops, smart phones, personal digital assistants (PDAs), tablets, and the like.

The client devices 102 are communicatively coupled to the eDRM server 104 over the network 106 through one or more communication links, for example, via dial-up modem connections, cable links, and digital subscriber lines (DSL), wireless or satellite links, or any other suitable form of communication through the network 106. The network 106 may be a wireless network, a wired network or a combination thereof. The network 106 may be implemented as one of the different types of networks, such as intranet, local area network (LAN), wide area network (WAN), and the internet. In an implementation, the client devices 102 may be communicatively coupled to the eDRM server 104 over a cloud based network.

Examples of the eDRM server 104 may include, but are not restricted to, a server, a workstation, a computer, and the like. The eDRM server 104 is communicatively coupled to an eDRM database 108 for storing data. Further, the eDRM server 104 includes an assignment module 110 and a locking module 112. According to an embodiment of the present subject matter, the client device 102 may be communicatively coupled with the eDRM server 104. In an implementation, the client device 102 may be communicatively coupled with the eDRM server 104 using a web application through any known integration techniques, such as protocol buffers. In one example, the web application may be created by any user, such as an IT administrator, using any known software framework, such as .Net and Java, based on the eDRM server application programs interface, and may be accessed by the client device 102 to communicate with the eDRM server 104. In another example, the web application may be provided an eDRM team. Thus, the coupling of the client device 102 with the eDRM server 104 through the web application enables an easy access of the eDRM server 104 without a need for installing a specific application on the client device 102.

Upon successful coupling of the client device 102 with the eDRM server 104 through the web application, the user, such as the IT administrator, may create login credentials for a user in the enterprise and store the created login credentials in the eDRM database 108. Thereafter, the user may access the web application through the client device 102 and provide the login credentials to the eDRM server 104. The login credentials may include, for example, a user ID, a digital certificate, and a password. Based on the provided login credentials, the eDRM server 104 authenticates the user by comparing the provided login credentials with the saved login credentials in the eDRM database 108. After a positive authentication, the user may request the eDRM server 104 for performing various functions, such as protecting documents and assigning rights to other users.

Upon authentication, the user may request the eDRM server 104 to encrypt the document and assign the access rights to other users. In an implementation, the user may be an owner having ownership of the document and may initially request the eDRM server 104 to protect the document by encrypting the document to generate a protected document before sharing the document with other users. After generating the protected document, the eDRM server 104 may assign access rights to the other users based on the assignment request. Examples of the access rights include, but are not limited to, open, edit, copy, print, delegate, and offline access. Table 1 below provides a brief description of the various access rights available to the owner. It is to be understood that the types of access rights described in Table 1 are exemplary and various other types of access rights may also be implemented.

TABLE 1

| Access Right | Description |
| --- | --- |
| Open | User may open a protected documents |
| Edit | User may edit or modify data in the protected documents |
| Copy | User may copy data from the protected documents and/or may take screen snapshots of the protected documents |
| Print | User may print the protected documents |
| Delegate | User having one or more above access rights may delegate all the access rights to another user |
| Offline access | User having one or more above access rights may access the protected documents by downloading offline database |

As described previously, the eDRM server 104 may receive the assignment request for assigning one or more access rights to a user or a group of users from the owner. Upon receiving the assignment request, the assignment module 110 assigns access rights of the document to the user or the group of users. The information pertaining to the assignment of the access rights to the user or the group of users, hereinafter referred to as assigned access rights information, is stored in the eDRM database 108. In an implementation, different access rights may be assigned to one or more users by the assignment module 110 based on the assignment request. For example, a user A may be provided with the access rights to open and print the documents, while another user B may be provided with access rights to open, edit, and print the documents. In another implementation, same access rights may be assigned to one or more users. For example, the users A and B may be provided with the access rights to open, edit, and print the documents. The users to whom the access rights are granted may be divided into various categories such as administrator, temporary owner, assignees, and so on.

An assignee may be understood as a regular user or a group of users having access rights of a protected document, without having the ownership of that protected document. Further, it may be understood that a user, at the same time may be an owner of a first protected document, may be an assignee for a second protected document, and may have no access rights for a third protected document. Therefore the term owner, assignee, or user is used with reference to a protected document. A temporary owner may be understood as a user having temporary ownership of a protected document. An administrator may be understood as a user having administrative powers to control and manage access rights of owners, temporary owners, and assignees.

After being assigned the access rights, the user may access the protected document using the client device 102 in accordance to their assigned access rights through the web application. In order to prevent any misuse of the protected document by the user, the locking module 112 may monitor action taken by the user on the protected document. In one implementation, the any action taken on the protected document by the user may include opening of the protected document, editing of the protected document, printing of the protected document, taking a screenshot of the protected document, copying content of the protected document, saving the protected document, and so on. Based on the monitoring, the locking module 112 may lock the user from further accessing the protected document if the action indicates a misuse of the protected documents. For example, if a user A who is not assigned the access right to share a protected document, tries to share the protected document with user B, then the eDRM server may lock the user A from using other access rights, such as opening, accessing, and editing the protected document.

In one implementation, the locking module 112 may lock the user from accessing the protected document upon receiving the lock request from the owner based on an analysis of the access information. In one another implementation, the IT administrator may send the lock request to the locking module 112 to lock a user based on an analysis of the access information. Further, based on the monitoring, the locking module 112 may inform the user if the user or the protected document is locked when the user tries to access the protected document. Further, in one implementation, the eDRM server 104 may not grant any request, such as access request, from the user who has been locked by the eDRM server 104.

Further, upon locking the user, the protected document may be closed if the protected document is open at the client device 102. For instance, if the protected document is already open at the client device 102, the user's access to the protected documents is forcefully terminated and an alert message, such as "user is locked" may be displayed to the user on the client device 102. Further, if the user tries to access a locked document, an alert message may be provided on the client device 102 indicating the user of the locking of the document. Thus, upon receiving a request to access a protected document, the locking module 112 determines whether the user A or the protected document is locked by the eDRM server 104. Based on the determining, the eDRM server 104 may inform the user A by displaying a message, such as "user is locked" and "document is locked" on the client device 102.

Further, a user having offline access rights may send a request to the eDRM server 104 for accessing the protected document when the connection is not available between the client device 102 and the eDRM server 104. Upon receiving the offline access request, the eDRM server 104 may provide an offline cache having access rights information of all the protected documents, for which the user has offline access rights, on the client device 102 when the connection is available between the client device 102 and the eDRM server 104. Upon receiving the offline cache on to the client device 102, the user may access the protected documents for a predetermined time period based on the access rights information when the connection is not available between the client device 102 and the eDRM server 104.

FIG. 2 illustrates the eDRM server 104, in accordance with one embodiment of the present subject matter. The eDRM server 104 includes processor(s) 202, interface(s) 204, and a memory 206 coupled to the processor(s) 202. The interface(s) 204 may include a variety of application programs and hardware interfaces, for example, a network interface allowing the eDRM server 104 to interact with the client devices 102 and the eDRM database 108. The interface(s) 204 may also facilitate multiple communications within a wide variety of networks and protocol types, including wired networks, for example, LAN, cable, etc., and wireless networks, such as WLAN, cellular, and satellite networks.

The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 is configured to fetch and execute computer-readable instructions and data stored in the memory 206.

The memory 206 may include any non-transitory computer-readable medium known in the art including volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one implementation, the eDRM server 104 may include module(s) 208 and data 210. The module(s) 208, amongst other things, include routines, programs, objects, components, data structures, etc., which perform particular tasks or implement data types. The module(s) 208 may also be implemented as, signal processor(s), state machine(s), logic circuitries, and/or any other device or component that manipulate signals based on operational instructions.

Further, the module(s) 208 can be implemented in hardware, instructions executed by a processing unit, or by a combination thereof. The processing unit can comprise a computer, a processor, such as the processor 202, a state machine, a logic array or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the module(s) 208 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can also be downloaded to the storage medium via a network connection.

In one implementation, the module(s) 208 further include the assignment module 110, the locking module 112, an offline access module 212, and other module(s) 214. The other module(s) 214 may include programs or coded instructions that supplement applications and functions of the eDRM server 104. The data 210 serves, amongst other things, as a repository for storing data processed, received, and generated by one or more of the module(s) 208. The data 210 includes access information data 216, user data 218, and other data 220. The other data 220 includes data generated as a result of the execution of one or more modules in the module(s) 208.

As described previously, the assignment module 110 may receive the encrypt request from the owner for protecting a document. The information received through the encrypt request may be stored in as cache data in the user data 218. Based on the encrypt request, the assignment module 110 encrypts the document using cryptography techniques known in the art to generate the protected document. In one implementation, the assignment module 110 may receive the encrypt request from the owner for protecting a plurality of documents. Upon receiving the encrypt request, the assignment module 110 may encrypt the plurality of documents simultaneously, thereby reducing the time of encrypting documents. The assignment module 110 may further store the protected document in the eDRM database 108 along with document information. Examples of such document information include, but are not limited to, encryption keys used for decrypting the protected document, document identifier, owner identifier, file version number, document initialization vector, and so on. In one implementation, the protected documents may be saved on the client device 102.

After generation of the protected document, the owner may send the assignment request to the assignment module 110 for assigning access rights to a user or a group of users, hereinafter collectively referred as user. In an example, the request may include information about the user, protected document, access rights, time period, and so on. Upon receiving the assignment request, the assignment module 110 may assign the access rights to the user and save the assigned access rights information in the eDRM database 108. After being assigned the access rights, the user may access the protected document by sending an access request to the assignment module 110. In one implementation, the protected document may be available on the client device 102. In another implementation, the protected document may be shared with the client device 102 via a pen drive. The access request may be understood as a request for opening the protected document in a readable format and may contain information about the protected document such as document id, and the user, such as user id. The information received through the access request may be stored in as cache data in the user data 218. Upon receiving the access request, the assignment module 110 determines whether the user has the access right for accessing the protected document by checking the assigned access rights information stored in the eDRM database 108 based on the user data 218. The assignment module 110 opens the protected document on the client device 102 in a readable format upon positive determination. In case it is determined that the user does not have the access right, the assignment module 110 restricts the opening of the protected document and provides a suitable message indicating that the user does not have the suitable access rights.

As described previously, upon accessing the protected document by the user, the locking module 112 monitors action taken by the user on the protected document based on the assigned access rights information. The access rights information may include information about any action taken on the protected document by the user, such as opening of the protected document, editing of the protected document, printing of the protected document, taking a screenshot of the protected document, copying content of the protected document, and saving the protected document. The actions taken by the user may be stored as the access information data 216 in the eDRM server 104. The locking module 112 may lock the user when the access information data 216 indicates that the user is misusing the protected document. In one implementation, the misuse of the protected document by the user may be indicated by an action taken on the protected document that is not allowed by the access rights assigned to the user. Upon locking the user, the user is restricted from further accessing the protected document. In one implementation, the owner may send the lock request to the locking module 112 for locking the user from accessing the protected document based on the access information data 216. Upon receiving the lock request, the locking module 112 may lock the user from accessing the protected document. Additionally, the locking module 112, may unlock a locked user upon receiving such an unlock request from the owner.

Furthermore, the user may send an access request to the assignment module 110 for getting access rights to the protected document from the owner of the protected document. In an implementation, the access request may include a selection of the protected document and corresponding access rights for the selected protected document. Based on the received access request, the assignment module 110 may send access request information to the owner of the selected protected document through a preferred communication, such as an email. The access request information may include information about the user, the selected protected document, the selected access rights, and other related information. The information received through the access request may be stored in as cache data in the user data 218. Upon receiving the access request information in the email, the owner may accept the access request and may send the assignment request to the assignment module 110 as described previously. In case the owner rejects the request, the assignment module 110 may provide a suitable message to the user indicating that the access rights are not granted.

Furthermore, the owner may send a temporary assignment request to assign ownership rights temporarily to another user for sending various requests including generating protected document, granting or denying rights requests made by users for assigning access rights to protected document, and so on. The owner may send the temporary assignment request to the assignment module 110. The temporary assignment request may include, for example, a transfer owner ID and time period for which the ownership is to be assigned. The information received through the temporary assignment request may be stored in as cache data in the user data 218. Upon receiving the temporary assignment request, the assignment module 110 may assign the temporary ownership to the user. The user to whom the temporary ownership is assigned is known as a temporary owner. The temporary owner has the right of generating protected document, viewing the protected document, and granting or denying access requests made by other users for assigning access rights to the protected document. The temporary owner may request the assignment module 110 for assigning access rights to other user in a manner followed by the owner. Further, the temporary owner may be restricted from requesting the assignment module 110 for changing a time period of the temporary ownership and for assigning the temporary ownership to other users. Subsequent to assigning the temporary ownership, the assignment module 110 may provide information related to assignment of the temporary ownership to the eDRM database 108.

It is to be understood that when the temporary ownership is active, the temporary owner may enjoy the access rights of the owner. Once the time period of the temporary ownership of a protected document expires, the temporary owner shall not be able to possess the ownership rights of that document. However, the temporary owner may be able to access the document as a regular user if the access rights were assigned or delegated to him.

Further, the owner may send the temporary assignment request to assign temporary rights to another user only for granting or denying access requests made by users for assigning access rights to protected document. The owner may send the temporary assignment request to the assignment module 110. The temporary assignment request may include, for example, a rights secretary ID, and time period for which the ownership is to be assigned. The information received through the temporary assignment request may be stored in as cache data in the user data 218. Upon receiving the temporary assignment request, the assignment module 110 may assign temporary rights to the user for only granting or denying the access requests made by other users. The user to whom such a temporary right is assigned may be known as a rights secretary. Also, the rights secretary may be restricted from requesting the assignment module 110 for changing a time period of the temporary rights and for assigning the temporary ownership to other users. Subsequent to assigning the temporary rights, the assignment module 110 provides information related to assignment of the rights secretary to the eDRM database 108.

The owner may further send a delegation request to the assignment module 110 to delegate all the access rights to other users. In one implementation, a user, hereinafter referred to as a delegator, other than the owner having certain access rights for protected documents may request for delegation of all the access rights to another user, hereinafter referred to as a delegatee. In an example, if user A has access rights to open and edit a protected document then user A may delegate the assigned access rights, open and edit, to user B. The delegator may send the delegate request to the assignment module 110 The delegate request may include information, for example, the document ID for which the access rights are delegated, the delegatee ID, and the delegator ID. The information may be stored as cache data in the user data 218. Based on the received delegate request, the assignment module 110 delegates the access rights of the delegator to the delegatee. The assignment module 110, thereafter, may provide the updated access rights information to the eDRM database 108.

Furthermore, the user to whom offline access rights are assigned may send the offline access request to the offline access module 212 to access the protected documents on the client device 102 when the client device 102 is not in communication with the eDRM server 104. In one implementation, the protected documents may be available on the client device 102. In another implementation, the protected documents may be shared with the client device 102 via a storage device, such as a pen driver. Upon receiving the offline access request, the offline access module 212 may provide an offline cache having access rights information of all the protected documents, for which the user has offline access rights, on the client device 102 when the connection between the client device 102 and the eDRM server 104 is available. In one implementation, the offline cache may be a local copy of access rights information about the protected documents from the eDRM database and may be downloaded as an encrypted file having access rights information of the protected documents on the client device 102. Upon receiving the offline cache onto the client device 102, the user may access the protected documents based on the access rights information for a predetermined time period, for example, 3 days, when the connection is not available between the client device 102 and the eDRM server 104. After the expiry of the time period, the access to the protected documents may be restricted. In one implementation, the user may again send the offline access request to the offline access module 212 to access the protected documents after the expiry of protected documents.

FIG. 3 illustrates a method 300 for controlling access rights to a document using eDRM, in accordance with an implementation of the present subject matter. The method 300 may be described in the general context of computer executable instructions. Generally, computer executable instructions may include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks may be combined in any order to implement the methods, or alternative methods. Additionally, individual blocks may be deleted from the method 300 without departing from the spirit and scope of the subject matter described herein. Furthermore, the methods may be implemented in any suitable hardware, software, firmware, or combination thereof.

Referring to FIG. 3, the method 300 for controlling access rights to a document using eDRM is initiated at block 302, where the document is encrypted to generate a protected document. In one implementation, the owner may send the encrypt request to encrypt the document. Upon receiving the encrypt request from the owner of the document, a protected document is generated by encrypting the document using generally know encryption techniques. For example, the assignment module 110 may generate the protected document upon receiving the encrypt request from the owner of the document.

At block 304, access rights of the protected document are assigned to a user or a group of users. In one implementation, the owner may send the assignment request for assigning access rights to the user. Upon receiving the assignment request from the owner of the protected document, the assignment module 110 assigns the access rights to the user and sends access rights information to eDRM database 108. For example, the assignment module 110 may assign the access rights of the protected document to the user upon receiving the assignment request. In one implementation, the access right includes offline accessing the protected document when the connection between the client device 102 and the eDRM server 104 is not available.

At block 306, the actions taken by the user on the protected document is monitored based on the assigned access rights information. For example, the locking module 112 may monitor the actions taken by the user on the protected document.

At block 308, the user is locked from accessing the protected document based on the monitoring indicates that the user is misusing the protected document. For example, the locking module 112 may forcibly close the protected document if the protected document is open and may subsequently deny opening of the protected document in a readable format.

Any of the methods described herein may be implemented by computer-executable instructions in one or more computer-readable media (for example, computer storage media or other tangible media). Further, the methods described herein may be implemented in a plurality of programming languages.

Although embodiments for controlling access rights of a document using eDRM have been described in language specific to structural features and/or methods, it is to be understood that the invention is not necessarily limited to the specific features or methods described. Rather, the specific features and methods are disclosed as exemplary embodiments for controlling access rights of a document using eDRM.

I claim:

1. A method for controlling access to a protected document by an enterprise digital rights management (eDRM) server communicatively coupled with a client device, the method being executed by one or more processors of the eDRM server by performing the steps of:

encrypting, by an assignment module, a document to generate the protected document;

assigning, by the assignment module, at least one access right to a user on the client device for accessing the protected document, wherein the at least one access right includes offline accessing of the protected document for a predetermined time period;

creating, by the assignment module, a temporary owner of the protected document based on a temporary assignment request, with a transfer owner ID and time period for which temporary ownership is to be assigned, received from the user, wherein the temporary owner is provided with rights of generating the protected document, viewing the protected document, and granting or denying access requests made by other users for assigning access rights to the protected document;

receiving, by an offline access module, an offline access request from the user assigned with offline access rights to access the protected document on the client device, and wherein the offline access module provides an offline cache having access rights information of the protected document from an eDRM database and downloadable as an encrypted file on the client device when the connection is available, wherein the offline cache allows access of the protected document to the user on the client device for the predetermined time period based on the access rights information, wherein the eDRM server allows the user to access the protected document for the predetermined time period when the connection between the client device and the eDRM server is unavailable;

retrieving, by a locking module, access information data of the user stored by the eDRM server indicative of actions performed by the user on the protected document based on the assigned access rights information, wherein the actions include misuse of the protected document by the user on the client device; and locking, by the locking module, the user from accessing the protected document upon detecting misuse of the protected document on the client device, wherein the locking further comprises:

closing the protected document if the protected document is open and displaying an alert message on the client device; and rejecting a request to open the protected document and displaying an alert message on the client device.

2. The method as claimed in claim 1, wherein the method further comprises transferring, by the assignment module, ownership of the protected document to the user for a predetermined time period.

3. The method as claimed in claim 1, wherein the method further comprises assigning, by the assignment module, access rights to the user based on the temporary assignment request from the user.

4. An enterprise digital rights management (eDRM) server communicatively coupled with a client device for controlling access to a document, the eDRM server comprising:

an assignment module to:

generate a protected document by encrypting the document;

assign at least one access right to a user on the client device for accessing the protected document, wherein the at least one access right includes offline accessing of the protected document for a predetermined time period;

create a temporary owner of the protected document based on a temporary assignment request, with a transfer owner ID and time period for which temporary ownership is to be assigned, received from the user, wherein the temporary owner is provided with rights of generating the protected document, viewing the protected document, and granting or denying access requests made by other users for assigning access rights to the protected document:

an offline access module to:
  receive an offline access request from the user on the client device assigned with offline access rights to access the protected document on the client device; and
  provide an offline cache having access rights information of the protected document from an eDRM database and downloadable as an encrypted file on the client device when the connection is available, wherein the offline cache allows the user on the client device to access the protected document based on the access rights information, wherein the eDRM server allows the user to access the protected document for the predetermined time period when the connection between the client device and the eDRM server is unavailable; and a locking module to:
  retrieve access information data of the user stored by the eDRM server indicative of actions performed by the user on the protected document based on the assigned access rights information, wherein the actions include a misuse of the protected document by the user on the client device;
  lock the user from accessing the protected document upon detecting misuse of the protected document on the client device; and
  wherein the locking by the locking module further comprises:
    closes the protected document if the protected document is open and displays an alert message on the client device; and
    rejecting a request to open the protected document and displays an alert message on the client device.

5. The eDRM server as claimed in claim 4, wherein the assignment module further transfers ownership of the protected document to the user for a predefined time period.

6. The eDRM server as claimed in claim 4, wherein the assignment module further receives a request for assigning access rights to the protected document by the user.

7. A non-transitory computer-readable medium having embodied thereon a computer program for executing a method of controlling access to a protected document by an enterprise digital rights management (eDRM) server communicatively coupled with a client device, the method being executed by one or more processors of the eDRM server by performing the steps of:
  encrypting a document to generate the protected document;
  assigning at least one access right to a user on the client device for accessing the protected document, wherein the at least one access right includes offline accessing of the protected document for a predetermined time period;
  creating a temporary owner of the protected document based on a temporary assignment request, with a transfer owner ID and time period for which temporary ownership is to be assigned, received from the user, wherein the temporary owner is provided with rights of generating the protected document, viewing the protected document, and granting or denying access requests made by other users for assigning access rights to the protected document;
  receiving an offline access request from the user assigned with offline access rights to access the protected document on the client device;
  providing an offline cache having access rights information of the protected document from an eDRM database and downloadable as an encrypted file on the client device when the connection is available, wherein the offline cache allows the user on the client device to access the protected document based on the access rights information, wherein the eDRM server allows the user to access the protected document for a predetermined time period when the connection between the client device and the eDRM server is unavailable;
  retrieving access information data of the user stored by the eDRM server on the client device indicative of actions performed by the user on the protected document based on the assigned access rights information, wherein the actions include misuse of the protected document by the user on the client device; and
  locking the user from accessing the protected document upon detecting misuse of the protected document on the client device,
  wherein the locking further comprises:
    closing the protected document if the protected document is open and displaying an alert message on the client device; and
    rejecting a request to open the protected document and displaying an alert message on the client device.

8. The non-transitory computer-readable medium as claimed in claim 7, wherein the method further comprises transferring ownership of the protected document to the user for a predetermined time period.

* * * * *